W. SPIERS.
CIRCULAR KNITTING MACHINE.
APPLICATION FILED OCT. 7, 1913.

1,210,866.

Patented Jan. 2, 1917.
9 SHEETS—SHEET 1.

WITNESSES:
John C. Sanders
Albert F. Heuman

INVENTOR:
William Spiers
BY Wallace White
ATT'Y

W. SPIERS.
CIRCULAR KNITTING MACHINE.
APPLICATION FILED OCT. 7, 1913.

1,210,866.

Patented Jan. 2, 1917.
9 SHEETS—SHEET 2.

W. SPIERS.
CIRCULAR KNITTING MACHINE.
APPLICATION FILED OCT. 7, 1913.

1,210,866.

Patented Jan. 2, 1917.
9 SHEETS—SHEET 3.

WITNESSES:
John C. Sanders
Albert F. Houman

INVENTOR:
William Spiers
By M. Wallace White
ATTY

Fig. 15.

UNITED STATES PATENT OFFICE.

WILLIAM SPIERS, OF LEICESTER, ENGLAND.

CIRCULAR-KNITTING MACHINE.

1,210,866.

Specification of Letters Patent.

Patented Jan. 2, 1917.

Application filed October 7, 1913. Serial No. 793,791.

*To all whom it may concern:*

Be it known that I, WILLIAM SPIERS, a subject of the King of Great Britain, citizen of Leicester, England, residing at Leicester, in the county of Leicester, England, have invented new and useful Improvements in or Relating to Circular-Knitting Machines, of which the following is a specification.

This invention relates to circular knitting machines for the production of seamless hosiery.

The invention is particularly applicable to circular knitting machines of the superposed cylinder type such as described in prior British specification No. 15008 of 1900, the machine being furnished with inside sinkers such as described in the prior British Patent No. 23560 of 1895, and being capable of rotary and rotary reciprocating motion, the operation of the machine being automatic throughout.

The main object of the invention is to improve the construction and arrangement of machines of the kind above mentioned whereby their speed may be considerably increased, thus increasing the output. The aforesaid improvement also brings about *inter alia*, a more steady and smooth-running of the machine, and a reduction in the cost of such machines.

Machines of the kind hereinbefore mentioned have hitherto been built with stationary needle cylinders and rotary cam boxes, and the most important feature of improvement according to the present invention is that the machine has needle cylinders which are capable of rotation and rotary reciprocation within stationary cam boxes. It is principally if not wholly on account of this feature that a machine constructed in accordance with this invention may be run at a considerably increased speed seeing that the needle cylinders, being not only of smaller diameter than the cam boxes, but being also practically balanced on their axis, may conveniently be rotated at a greater speed than could the unbalanced cam boxes.

Other subsidiary improvements are also effected as will be hereinafter explained all of which tend toward the production of a machine of generally improved form.

The invention will be hereinafter described with reference to the accompanying drawings, wherein:—

Fig. 1 is drawn to a smaller scale and Fig. 14 to a larger scale than the remaining figures, and like parts are designated by the same reference characters throughout the drawings.

In a circular knitting machine constructed and arranged according to this invention, the needle cylinders 1 and 2 are rotatable, the bottom cylinder 2 being driven by bevel wheels 3, 4 from a driving shaft 5, and the top cylinder 1 being driven from the bottom cylinder by means of gears 6, 7, a vertical shaft 8 and gears 9, 10, the gears or teeth 6 and 10 being on the bottom and top needle cylinders respectively. In the present case the cam boxes are fixed, the bottom cam box 11 to the machine bed 12, and the top cam box 13 to a plate 14 supported upon the bed 12 by columns 15. One or both needle cylinders have movable sinkers or loop holders A therein and these are mounted in tricks in a carrier ring B in the usual manner but rotate with the cylinders. The sinker cam C is of the usual character and is arranged in combination with the sinker carrying ring, but in the present case said cam remains stationary except during the reciprocating movement of the cylinders when knitting the heel and toe as will be described later.

Figure 14:
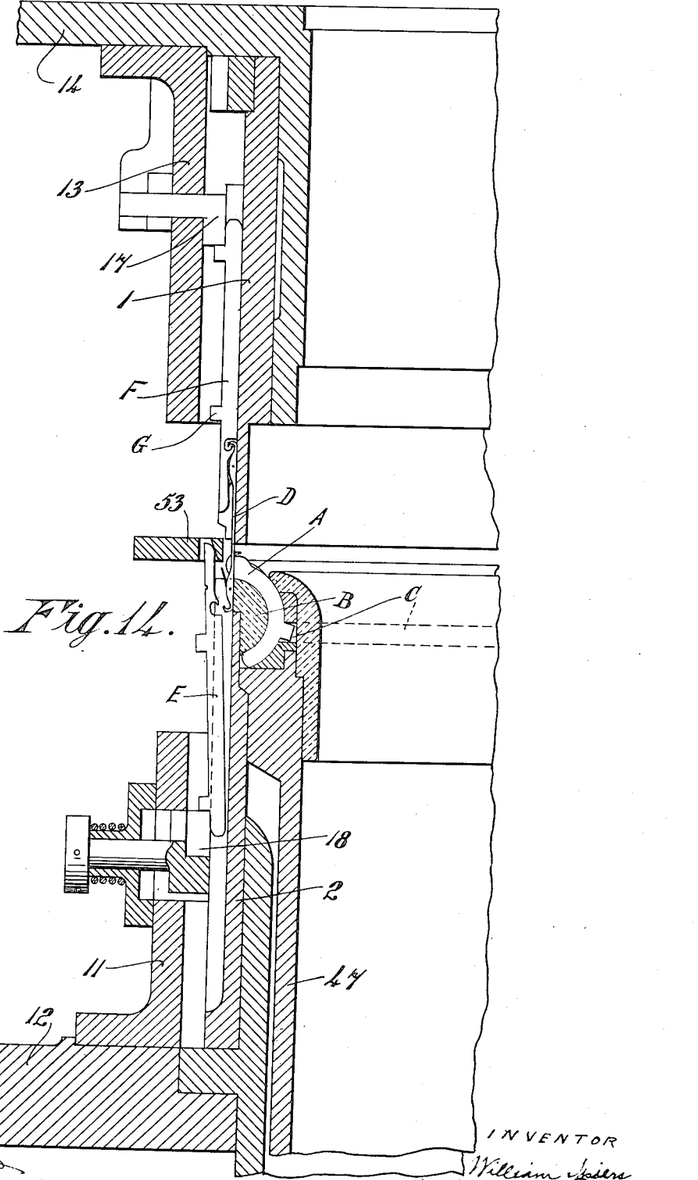
Fig. 14 is a vertical sectional view through the needle cylinder and contiguous parts.
Figure 15:
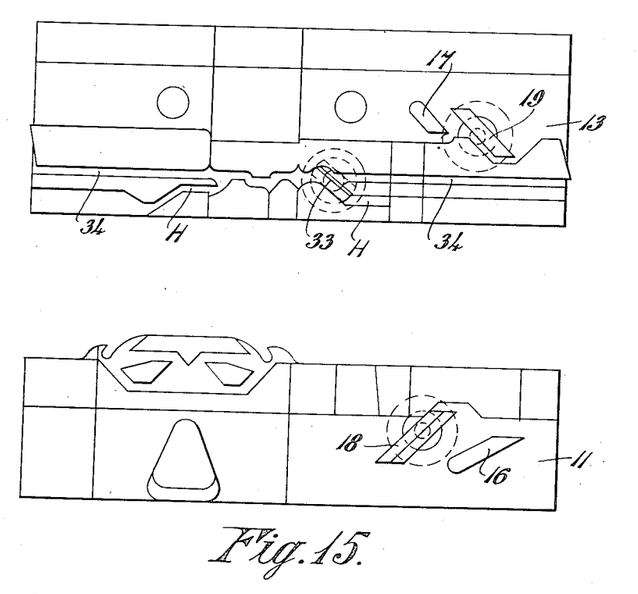
Fig. 15 is an interior projection of the cam boxes showing the arrangement of cams thereon.

One of the features of improvement consists in making the cylinders shorter than heretofore and providing for needle transferring purposes, additional cams to actuate the receiving sliders so that they are moved to meet the needles D during transference thereby assisting this operation to take place. To this end there is provided in each cam box 11 and 13 an additional cam 16 and 17 respectively (Figs. 2, 14 and 15) which may be termed a receiver cam. When the usual transfer cam 18 in the cam box 11 actuates the sliders E (Fig. 14) to transfer certain of the needles D from the cylinder 2 to the cylinder 1, the receiver cam 17 in the other cam box 13 coöperates with said transfer cam 18 and causes the opposite or receiving sliders F of the cylinder 1 to move toward the needles being transferred so that the latter are taken from the transferring sliders E of the bottom cylinder 2 and the operation of transferring is completed by the receiving sliders. In like manner when transferring takes place from the cylinder 1 to the cylinder 2 the receiver cam 16 of the bottom cam box 11 coöperates with the usual transfer cam 19 of the top cam box 13. In this manner the movement of the sliders in each cylinder need not be so long as heretofore.

Figure 2:
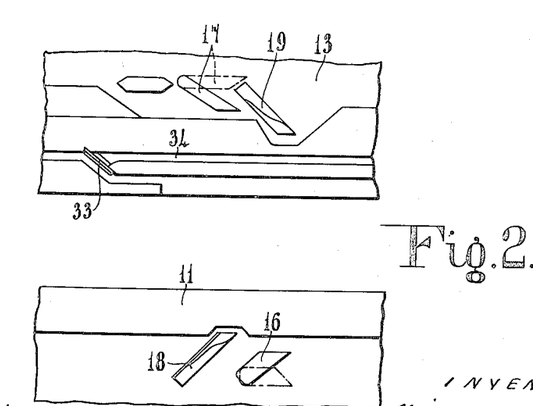
Fig. 2 is an inside view of part of the upper and lower cam boxes.

In Fig. 2 the operative and inoperative positions of the receiver cams 16, 17 are represented by dotted and full lines respectively. Each additional or receiver cam 16, 17 may be put into and out of action simultaneously with its corresponding transfer cam 19, 18 in the opposite cam box, and for this purpose each transfer cam and its receiver cam may be coupled together by suitable mechanism so that the mechanism which controls the transfer cam may also effect the actuation of the corresponding receiver cam. For instance, a rod or link may connect the actuating device of one cam with the actuating device of the coöperating cam on the other cam box.

Figure 3:
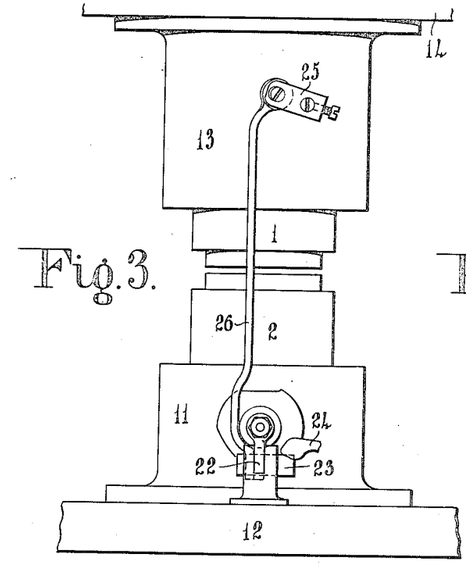
Fig. 3 is a front view and Fig. 4 is a side view of the means for actuating the bottom transfer and top receiver cams.
Figure 4:
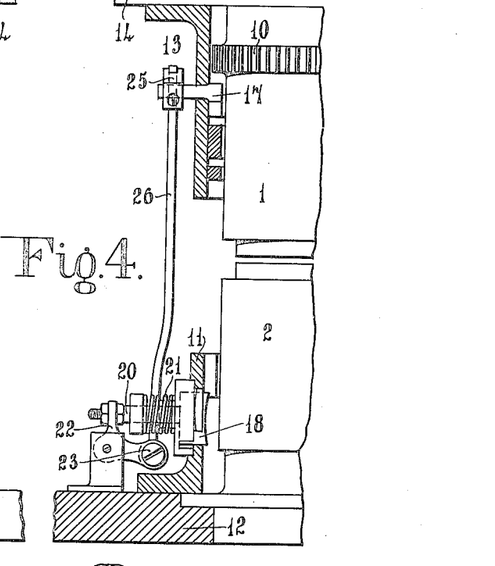
Figure 5:
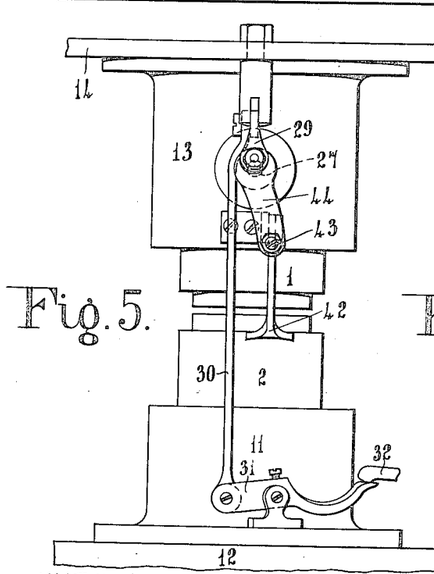
Fig. 5 is a front view and Fig. 6 is a side view of the means for actuating the top transfer and bottom receiver cams.
Figure 6:
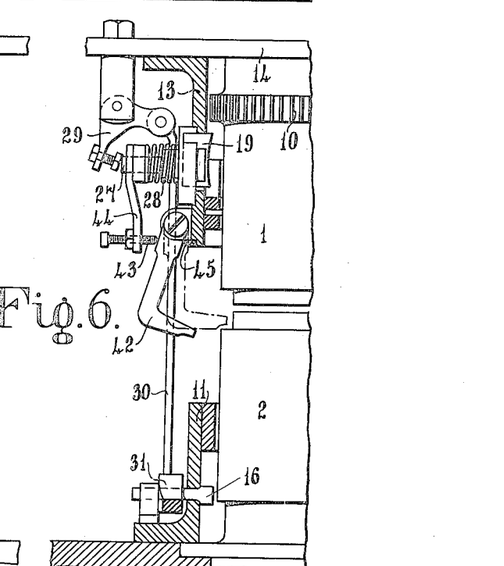

A constructional embodiment of the arrangement just mentioned is shown in Figs. 3 to 6. In Figs. 3 and 4, the lower transfer cam 18 is mounted on the inner end of a plunger rod 20 movable through the cam box 11 and actuated outward by a spring 21. The plunger rod 20 is moved inward (to put the transfer cam into operation) by turning of a bell-crank lever 22 one arm of which bears against the end of the plunger rod, the other arm having a pin 23 upon which the end of a lever 24, hereinafter referred to, presses. The pivotal coöperating receiver cam 17 has an arm 25 on its axis which arm is connected with the bell-crank lever 22 by a rod 26 whereby the cam 17 is actuated simultaneously with the cam 18. In Figs. 5 and 6, a plunger rod 27 carrying the upper transfer cam 19 is movable inward against the action of the spring 28 by a bell-crank lever 29 which is connected by a rod 30 with a rock lever 31 on the axis of the pivotal receiver cam 16. A lever 32, hereinafter referred to, presses upon the rock lever 31 and the simultaneous actuation of the cams 16 and 19 is thereby effected.

Figure 7:
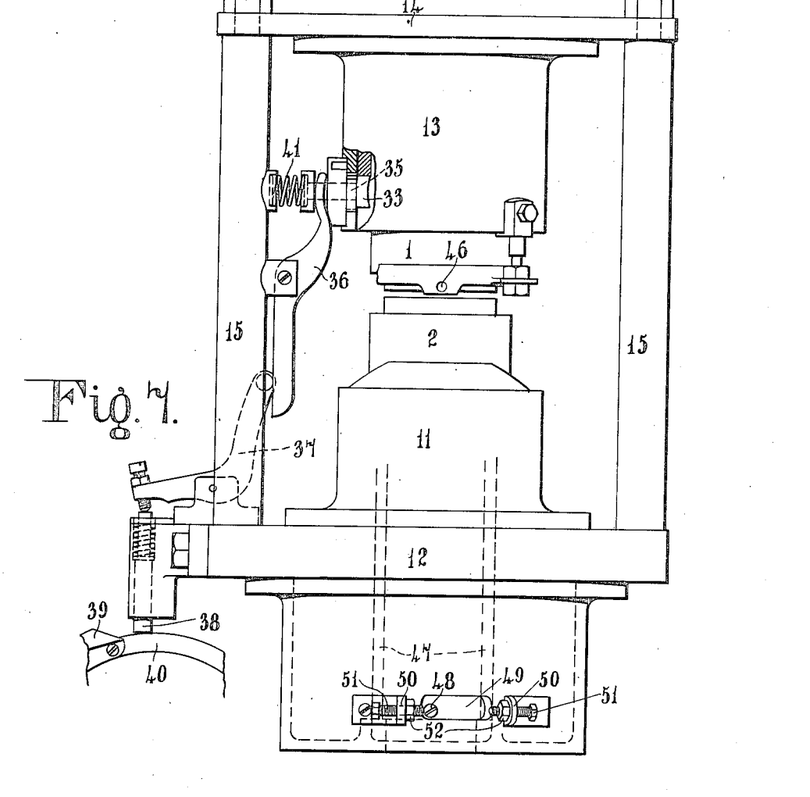
Fig. 7 is a side-elevation showing the mechanism for actuating the idle track cam, and the devices for limiting the movement of the sinker cam.
Figure 8:
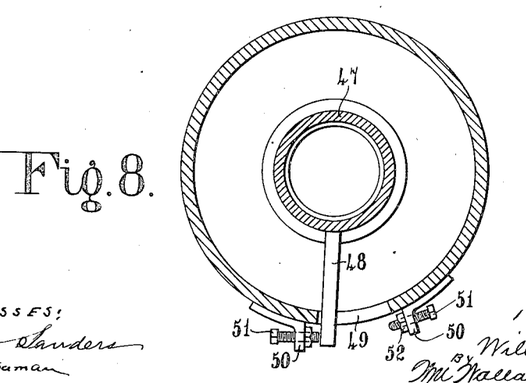
Fig. 8 is a sectional plan showing the last mentioned devices.

In the machine of this invention a cam 33 (Figs. 2 and 15) may be furnished in the top cam box 13 to allow the sliders F to pass along the idle track 34 during the knitting of plain fabric so that unnecessary wear on the sliders is avoided. This cam 33 is mounted upon the inner end of a plunger rod 35 (Fig. 7) movable through the cam box 13 and is put into and out of action automatically, when required, by means of a lever 36 pivoted on one of the columns 15 actuated by a lever 37 which in turn is moved by spring plunger pin 38 raised by a cam 39 on a drum 40 (described later). The mechanism just described moves the cam 33 outward to allow the slider butts G to pass along the track 34, and a spring 41 moves the rod 35 in the opposite direction. There may be employed in conjunction with the cams 16 and 19 for transferring the needles from the top to the bottom cylinder, a latch guard 42 (Figs. 5 and 6) to prevent the needle latches closing during transference. This latch guard is pivotally mounted on the cam box 13 and by means of a screw 43 in a plate 44 on the plunger rod 27 of the transfer cam 19 is brought into action simultaneously with said cam. The latch guard 42 is moved out of action by a spring 45 simultaneously with the withdrawal of the transfer cam 19. The inoperative and operative positions of the latch guard are shown by full and dotted lines respectively in Fig. 6, and when in operation it presses upon the needle latches to prevent them closing. The operative connection between the cam 19 and latch guard 42 being through the medium of the screw 43, the timing or correlation of the cam and guard may be varied or adjusted as required. In the improved machine a hole 46 (Fig. 7) instead of the usual long slot may be provided for feeding the thread to the needles.

As previously stated, the sinker cam C is stationary except during the reciprocating motion of the needle cylinders when knitting the heel and toe. During this operation the sinker cam has a rotary reciprocating movement which takes place partly in company with the cylinders said movement being brought about by the movement of the cylinders. The sinker cam is allowed a limited movement to either side of the feeder hole the movement of said cam in each direction being limited by an adjustable device hereinafter described. When the needle cylinders rotate in one direction the sinker cam is carried around with the cylinders until it is stopped by the device provided for this purpose, whereupon during the further movement of the cylinders, the sinker cam operates the sinkers A on one side of the feeder hole. When the cylinders reverse their motion, the sinker cam travels in company therewith until its movement is arrested by the other stopping device, whereupon it actuates the sinkers on the other side of the feeder hole. The sinker cam (Fig. 14) is attached to or connected with a sleeve 47 (Figs. 7 and 14) in the bottom needle cylinder 2 said sleeve having projecting therefrom a pin 48 or lug which extends through a slot 49 in the machine frame. During rotary reciprocation of the cylinders, the pin 48 moves to and fro along this slot 49 such movement being limited in either direction by adjustable stopping devices provided at each end of the slot. Said devices may each conveniently consist of a lug 50 on the frame in which lug is carried a screw 51. The projecting pin 48 on the sleeve 47 contacts with the inner ends of the screws 51 the latter constituting stops and by adjusting the same in the carrying lugs 50 the travel of the sinker cam to either side of the feeder hole may be equalized or regulated. Locknuts 52 may be furnished on the screws 51 to fasten them after adjustment. During the knitting of the heel and toe, pickers or needle selecting devices are employed for widening and narrowing these being of any known or other suitable character.

Figures 9, 10:
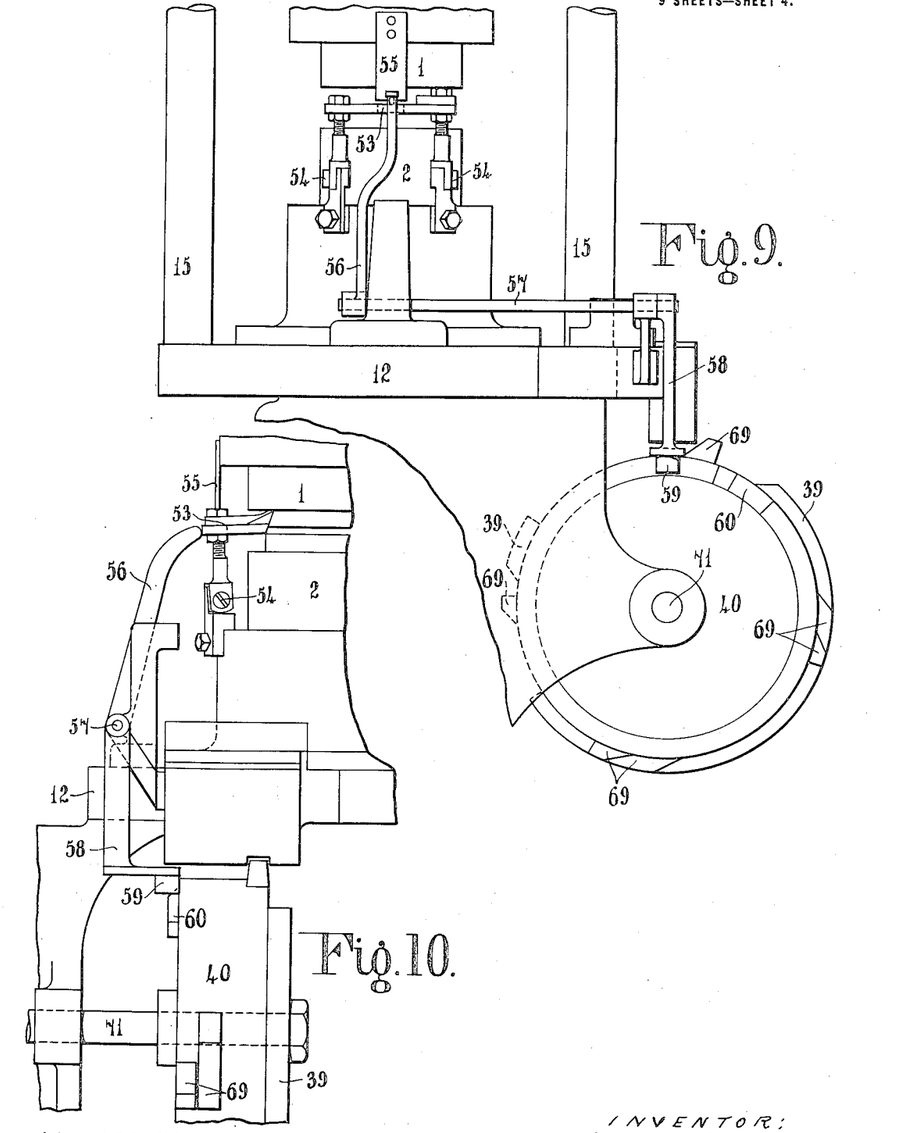
Figs. 9 and 10 are elevations showing an arrangement of the movable dividing cam and the mechanism for actuating same.

In machines of the smaller diameters it may be necessary to arrange the dividing cam i. e. the cam which disengages the sliders from the needles during transferring, in such a manner that it may be moved away from the side of the cylinders so as to be clear of the needle latches during the reciprocating motion when knitting the heel and toe thereby avoiding the possibility of bending or breaking latches by their contact with said dividing cam. To this end the cam may be mounted in a pivoted or other movable manner and may be actuated by independent mechanism or it may be actuated by means of connection with the mechanism which controls the picker selector in the locality of said cam. In the latter case when the picker is put into action the dividing cam would be moved away to be clear of the latches, then when the picker is taken out of action the dividing cam would be brought in again. One arrangement of this movable dividing cam is shown in Figs. 9 and 10, where the dividing cam 53 is movable upon pivots 54 toward and from the needle cylinder 2, a spring 55 attached to the cam box 13 normally pressing the cam away from the cylinder. The said dividing cam is moved inward at the times it is required for use by means of a lever 56 on a rockshaft 57 which at the opposite end has thereon a short arm 58 furnished at its extremity with a roller 59 upon which a cam 60 on the before mentioned drum 40 acts, causing the lever 56 to press the dividing cam 53 inward against the force of the spring 55. When the cam 60 passes out of contact with the roller 59 the spring 55 acts to move the cam 53 away from the cylinder 2. In machines of the larger diameters where the transferring cams and the dividing cam can be situated outside the locality of the picker the dividing cam may not be movable.

Figure 1:
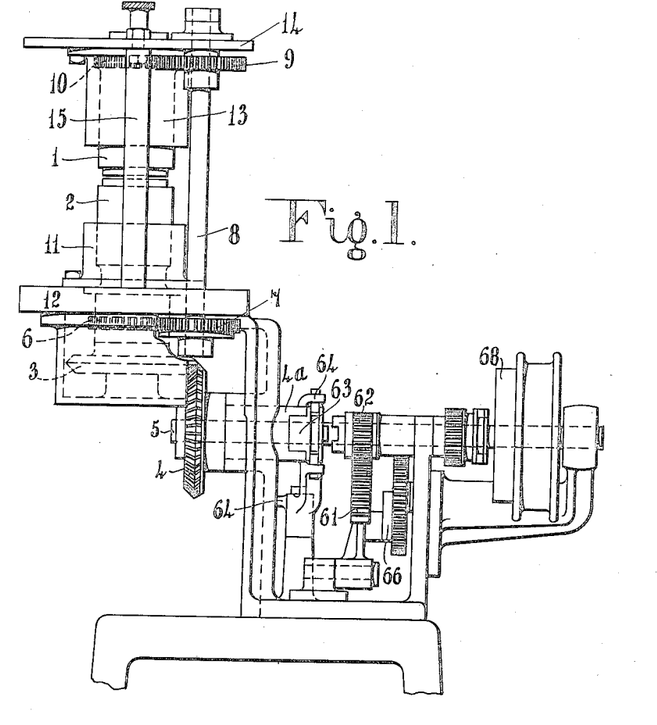
Figure 1 is an elevation of the machine viewed from the rear.
Figure 11:
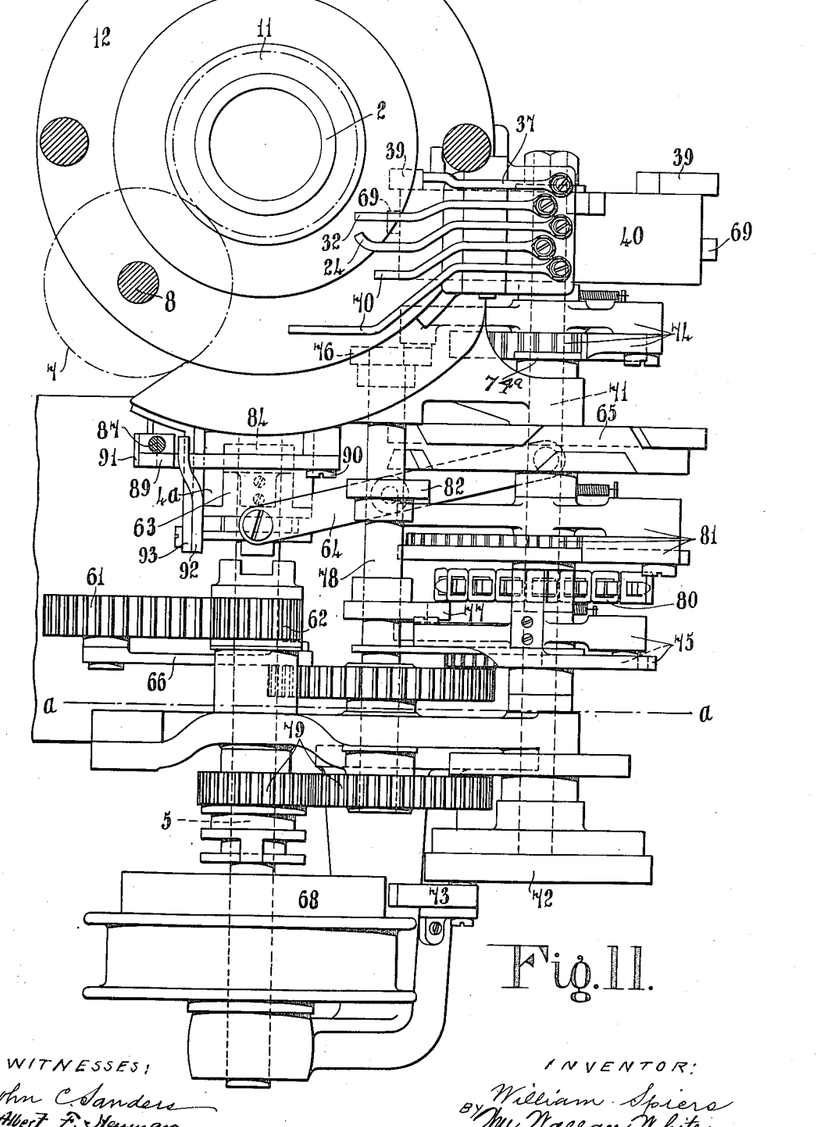
Fig. 11 is a plan of the driving and controlling mechanisms of the machine.
Figure 12:
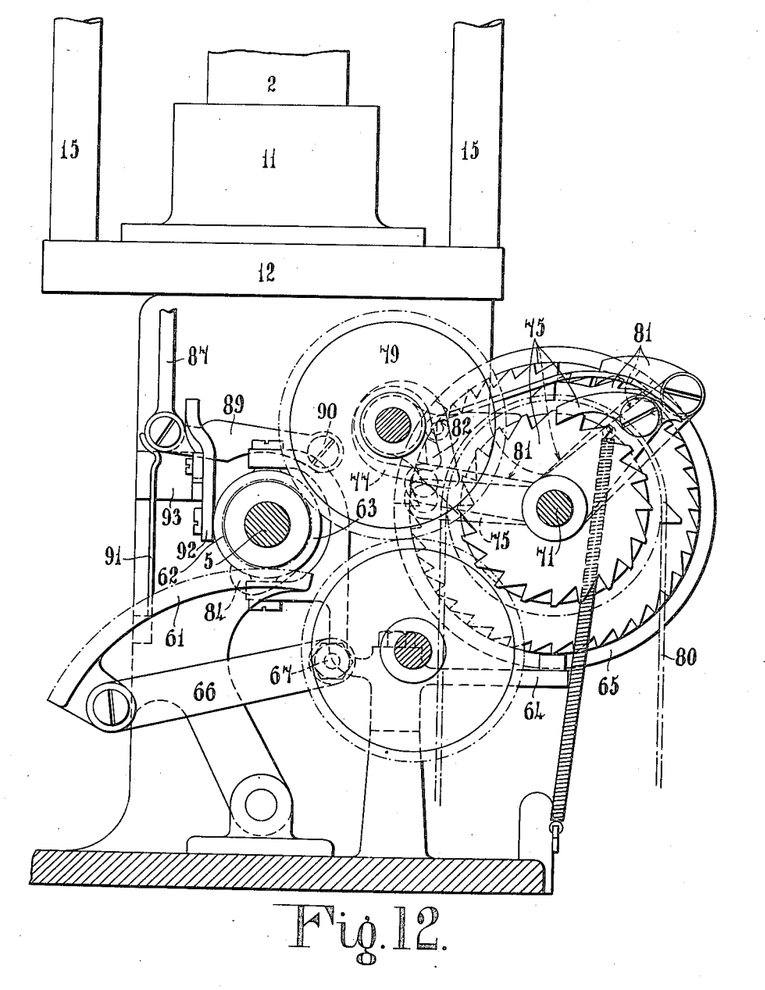
Fig. 12 is a transverse sectional view taken on the line *a—a* of Fig. 11.

The reciprocating motion is imparted to the cylinders by means of an oscillating sector 61 (Figs. 1 and 12) which gears with a pinion 62 on the actuating shaft 5 of the cylinders. The said pinion is loose on the shaft as is also the bevel wheel 4. A clutch member 63 is movable along the shaft by a shift lever 64 actuated by a cam 65 (Fig. 11) and is employed to cause continuous or reciprocatory motion of the cylinders by being moved to one position or another. That is to say, while engaging the boss $4^a$ of the bevel wheel 4 the clutch member may be clear of the pinion 62 when it engages a key or pin (not shown) in the shaft 5, while in the other position and still engaging the boss $4^a$ it is clear of the key or pin and engages the pinion 62. The sector 61 is actuated by a connecting link 66 from a crank pin 67. The driving shaft 5 may be furnished with a two speed gear device 68 (Figs. 1 and 11) so that the speed of the machine may be reduced during transferring. The changes may all be effected automatically by pattern mechanism a convenient form of which is shown in Fig. 11 and consists of a control drum 40 having studs, dogs or cams 39, 69, which actuate the various cams and other parts through the medium of levers 24, 32, 37, and 70, and suitable connecting means. This drum 40 is fixed on a shaft 71 on which is also fixed the cam 65 for actuating the shift lever 64, and a cam member 72 for actuating a lever 73 which controls the speed gear device 68. This shaft 71 is racked around by ratchet and pawl mechanisms 74, 75 as will be hereinafter described actuated by cams 76, 77, on an auxiliary shaft 78 driven by gearing 79 from the driving shaft 5. The actuation of the ratchet mechanism 75 is automatically controlled by stops on a pattern chain 80 which is racked around by ratchet and pawl means 81 operated by a cam 82 on the shaft 78. The operation of the pattern mechanism will be further elucidated in the description of the operation of the machine hereinafter set forth.

One advantage of the employment of controlling means such as the drum 40 is that a different stop or dog may be used for the toe than is used for the heel, so that if desired the toe and heel may be made different from one another in size. A further feature is that in producing either the heel or toe the number of needles employed during widening may differ from the number employed during narrowing.

Figure 13:
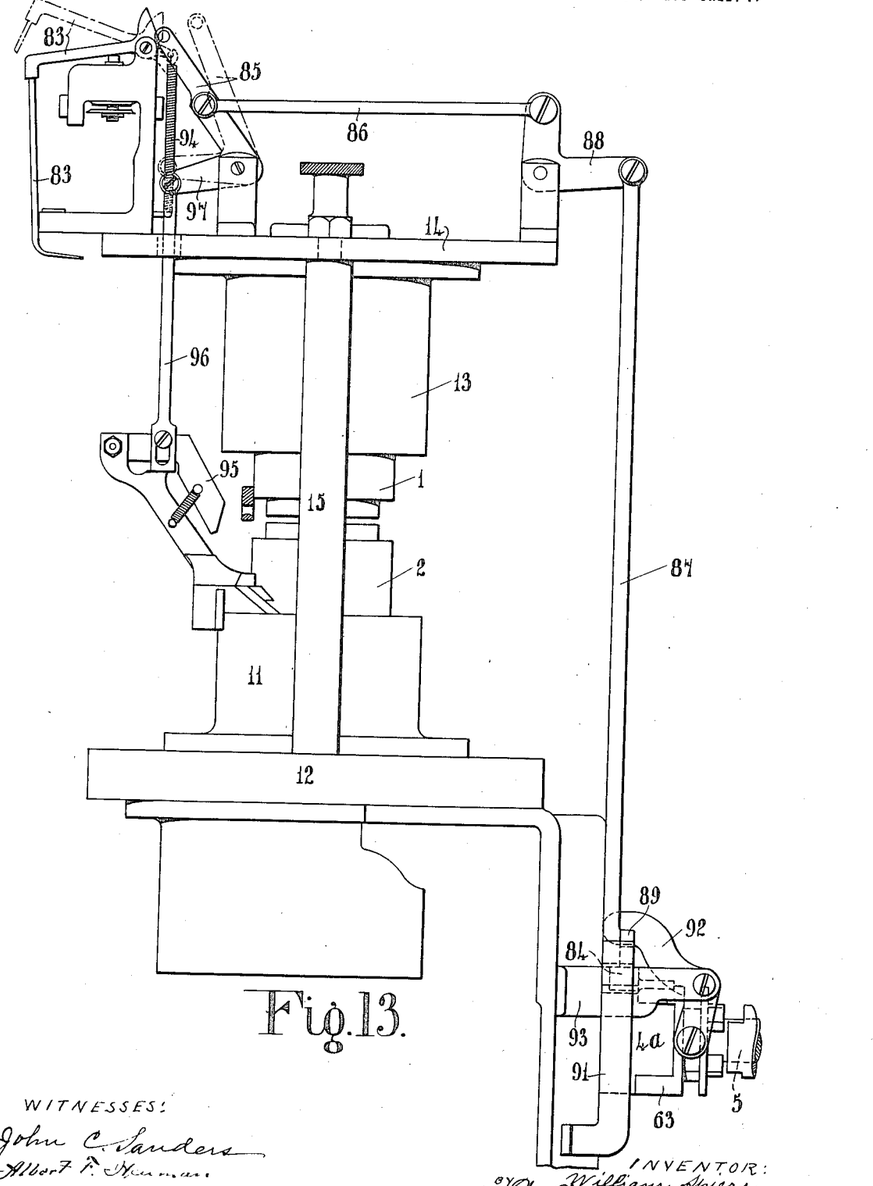
Fig. 13 is an elevation of the means for putting the take up device into and out of action.

Means may be furnished to put the thread take up device 83 (Fig. 13) out of action at the time the thread is drawn down by the needles when changing from the reciprocating to the continuous motion of the needle cylinders. These means comprise a cam 84 automatically put into action at the time required said cam acting on the connecting mechanism of the take up device. This mechanism consists of a lever 85 connected by rods 86, 87 and a bell-crank lever 88 to a lift lever 89. (Fig. 12) fulcrumed at 90. The cam 84 is connected to the movable clutch member 63 and moves therewith and thus as the said clutch member moves into and out of engagement with the pinion 62 the cam is brought respectively out of and into position under the lift lever 89. The lift lever is held raised by a pressing blade spring 91 and when so raised the lever 85 presses upon the take up device 83 and holds it out of action. The said device is brought into action by the movement of a bell-crank lever 92 carried by a bracket 93 which lever is connected with the clutch member 63 and when the latter moves to engage the pinion 62 the lever 92 presses the lift lever 89 down, the latter by the connections 87, 88 and 86 withdrawing the lever 85 from the take up device and releasing the latter which, actuated by its spring 94, comes into operation in the usual way. Upon the clutch member being moved from out of engagement with the pinion 62, the bell-crank lever 92 is raised from the lift lever 89, and then as the member 63 rotates with the shaft 5, the cam 84 raises the lift lever to the normal position whereupon it becomes held by the spring 91, the rise of said lever causing the lever 85 to press upon the take up device 83 and move it to the inoperative position shown by full lines in Fig. 13. A splicing thread feeder device 95 (Fig. 13) may be located in close proximity to the feed hole 46 which device may be connected by a rod 96 to an arm 97 on the lever 85 so as to be put into and out of operation automatically in conjunction with the take up device.

The operation of the machine is as follows: Assuming the machine at the start to be in a position with all the needles in the lower cylinder then the ratchet mechanism 74, actuated by a cam 76, on the shaft 78 (driven by gear wheels 79 from the main shaft 5) first racks the shaft 71 and consequently the drum 40 through the distance equivalent to one tooth, this moving the end of the stop 39 from under the pin 38 and thereby releasing the intermediate mechanism 37 and 36 to allow the cam 33 to be put into action to bring the top sliders F from the idle track 34 into the working track H. While this is taking place the ratchet mechanism 75 is not operating owing to the pawl thereof being held out of action by stops on the chain 80. The mechanism 74 again racks one tooth and the stop 60, through the medium of the intermediate mechanism 59, 58 and 56, moves the dividing cam 53 into the operative position prior to the transferring of certain of the needles to the top cylinder. During this time the ratchet and chain mechanism 82, 81 and 80 has been continuously operating and the stops on the chain 80 now release the pawl of the mechanism 75. At the same time a blind or guard portion 74$^a$ on the ratchet wheel 74 comes into position under the pawl thereof to prevent it engaging the teeth of the wheel so that this mechanism is put out of action, and the mechanism 75 actuated by the case 77 begins to rotate the shaft 71 which causes one of the stops 69 to effect the inward movement of the transfer cam 18 to transfer needles from the lower to the top cylinder as before described. The mechanism 75 continues to operate during which time a welt is knitted after which the lever 73 is operated by the cam member 72 to actuate the speed device 68 to speed up the machine and a further stop on the chain 81 disengages the pawl 75 from the teeth of the ratchet wheel. The mechanism 74 again comes into action owing to the blind or guard portion on the ratchet wheel thereof moving from under the pawl which thereupon reëngages the ratchet teeth. The machine then knits a rib top after which the mechanism 74 rotates the cam member 72 which moves the lever 73 to cause a reduction in the speed of the machine, said mechanism then again being rendered inoperative. The mechanism 75 then operates and the dividing cam 53 is moved into the operative position again prior to the transfer of needles from the top to the lower cylinder. The needles are then transferred and the top sliders switched into the idle track 34. The speed of the machine is again increased, whereupon the mechanism 75 is again rendered inoperative and the mechanism 74 operative. The machine then knits the leg portion of the hose after which the speed of the machine is reduced and the motion of the cylinder is changed from rotary to rotary reciprocating motion, this change being effected as before described by the cam 65 through the medium of the lever 64 and clutch member 63. At the same time a widening picker (not shown) is put into operation and the machine commences to knit the heel. When the heel is completed the cylinders again resume circular motion, the speed of the machine is increased, and the foot portion is knitted, after which a further operation of the ratchet mechanism 74 causes a reduction in the speed of the machine, the motion of the cylinder is again changed, a narrowing picker is put into operation and the toe portion is knitted. After this the widening mechanism operates and the machine resumes circular knitting, the operation being then repeated.

What I claim then is:—

1. A circular rib knitting machine having, in combination, stationary upper and lower cam boxes, superposed parallel needle cylinders capable of rotary and rotary reciprocating motion within said cam boxes, double ended latch needles therein, sliders to actuate said needles, a transfer cam and a receiver cam in the upper and lower cam boxes respectively adapted to coöperate to transfer needles from the top cylinder to the bottom cylinder, a transfer cam and a receiver cam in the upper and lower cam boxes respectively adapted to coöperate to transfer needles from the bottom to the top cylinder, means to automatically and simultaneously bring the said coöperating cams into and out of operation, means for effecting the rotary motion of the cylinders, and means for effecting rotary reciprocating motion thereof.

2. A circular rib knitting machine having, in combination, stationary upper and lower cam boxes, superposed parallel needle cylinders capable of rotary and rotary reciprocating motion within said cam boxes, double ended latch needles therein, sliders to actuate said needles, a transfer cam and a receiver cam in each cam box, an arm to actuate each receiver cam, a plunger to actuate each transfer cam, a lever to actuate each plunger, rods coupling the arms of the receiver cams with the levers of the transfer cams in opposite cam boxes, means for effecting the rotary motion of the cylinders, and means for effecting the rotary reciprocating motion thereof.

3. A circular knitting machine having, in combination, stationary upper and lower cam boxes, superposed parallel needle cylinders capable of rotary and rotary reciprocating motion within said cam boxes, double ended latch needles therein, sliders to actuate said needles, a transfer cam and receiver cam in each cam box, means for putting said cams into and out of operation, a latch guard comprising a finger pivotally mounted on the upper cam box, and means for actuating said guard comprising a spring to move it out of operation, a plate movable with the transfer cam in the upper cam box, and a screw in said plate engaging the latch guard whereby the latter is brought into action simultaneously with the transfer cam, substantially as described.

4. A circular knitting machine having, in combination, upper and lower stationary cam boxes, superposed parallel needle cylinders capable of rotary and rotary reciprocating motion within said cam boxes, double ended latch needles therein, sliders to actuate the needles, means to transfer said needles from one cylinder to the other, means for effecting the rotary motion of the cylinders, means for effecting the rotary reciprocating motion thereof, a divider cam pivotally mounted on the lower cam box, and means for putting the cam into and out of action comprising a pivoted lever, a cam, intermediate mechanism to operate the dividing cam in one direction from said cam, and a spring to operate the dividing cam in the opposite direction, substantially as described.

5. A circular knitting machine having superposed needle cylinders capable of rotary and rotary reciprocating motion within stationary cam boxes, movable sinkers arranged on the inside of the lower cylinder, a cam to actuate the said sinkers, said cam during the rotary motion of the cylinders remaining stationary and during the reciprocating motion having a restricted movement in company therewith, a sleeve on which said cam is mounted, said sleeve being capable of rotary reciprocation within the cylinder, and adjustable means to restrict the movement of the sleeve in each direction within the cylinder for the purpose described.

6. A circular knitting machine having superposed needle cylinders capable of rotary and rotary reciprocating motion within stationary cam boxes, movable sinkers arranged on the inside of the lower cylinder, a cam to actuate the said sinkers, said cam during the rotary motion of the cylinders remaining stationary and during the reciprocating motion having a restricted movement in company therewith, a sleeve on which said cam is mounted, said sleeve being capable of rotary reciprocation within the cylinder, a projecting member on the said sleeve and adjustable stops with which said member makes contact to restrict the movement of the sleeve within the cylinder as and for the purpose described.

In testimony whereof I have signed my name to this specification in the presence of two subscribing witnesses.

WILLIAM SPIERS.

Witnesses:
 FRANK DAVIS,
 GEORGE LESTER.